United States Patent Office 3,021,220
Patented Feb. 13, 1962

3,021,220
PREPARED BATTERS
Louis H. Going, Loveland, and Cornelis H. Japikse, Cincinnati, Ohio, assignors to The Procter & Gamble Company, Cincinnati, Ohio, a corporation of Ohio
No Drawing. Filed Aug. 3, 1959, Ser. No. 830,997
8 Claims. (Cl. 99—92)

This invention relates to prepared culinary batters. More particularly, it relates to compositions comprising farinaceous material, sugar, and aqueous material, which are stable against spoilage and physical deterioration, and which are suitable for use in preparing baked goods.

A large amount of baked goods are now made in the home by means of dry prepared mixes. In preparing batters from these mixes the housewife adds liquids, stirring thoroughly to mix the ingredients and incorporate air. Often the liquid ingredients must be added in several stages, with stirring between and/or during each addition. Although the use of such dry prepared mixes does represent an improvement over the basic method of batter preparation—in which shortening and sugar are first creamed together, and then dry ingredients, including flour, and liquid ingredients are alternately added while the mixture is continuously agitated—the housewife must still provide a mixing container and add liquid ingredients.

Attempts have been made to formulate baking batters for sale commercially. These batters have presented storage and shipping problems since they must be maintained under refrigerated conditions at all times prior to use by the ultimate consumer. Even when such batters are refrigerated, it has been found that mold and bacteria grow very rapidly, making the product unsuitable for edible use after a relatively short time.

It has been known that mold and bacterial growth can be inhibited in foods by heat sterilizing. However, heat will gelatinize starch in farinaceous materials, and even when minimum times and temperatures are used to achieve sterilization of batters, enough of the starch is gelatinized that baked products of desired quality cannot be produced.

It has now been found that if the heating of a batter is done under controlled conditions, as will hereinafter be defined, and if the batter is subsequently treated with a suitable acidic material, a sterile batter can be produced with acceptable baking properties.

While it is not desired to be bound by any theory, it is believed that increased polarity in the aqueous phase of a batter opens up hydrogen bonds which hold together the glucose polymers in the starch granule and which are not acted upon by water alone. In un-heat-treated batters only a part of the starch is utilized under normal baking conditions, and the rest does not gelatinize. A sterilization treatment will reduce the amount of starch which can be gelatinized, but addition of any material which increases the polarity of the aqueous phase will permit the normally unavailable part to become available for gelatinization during baking.

Accordingly, it is an object of this invention to provide a batter which is suitable for use in preparing baked goods of good and acceptable quality.

Another object is to prepare a baking batter which can be stored for extended periods of time without refrigeration and without undergoing deterioration of baking qualities, appearance of mold growth, or numerical increase of bacteria population.

Other objects and advantageous features will be apparent from the following detailed description.

In general, batters of this invention comprise heat-sterilized farinaceous material, sugar, aqueous material, water-soluble acidic material, and a microbiological inhibitor. The batter is prepared by first forming a homogeneous slurry comprising farinaceous material, sugar, and aqueous material. The slurry is rapidly heated to a temperature of from about 180° to 200° F., and maintained within that temperature range for a period of about 8 to 10 minutes, whereby the microbiological population of the slurry is substantially reduced. The slurry is then rapidly cooled to a temperature not greater than 140° F. in less than one minute. After the slurry has been cooled, a water-soluble acidic material is added in an amount capable of supplying about 30 to 65 milli-equivalents of hydrogen ions per 1000 grams of batter. If the acidic material does not have microbiological-inhibiting properties, an additional inhibitor should be added.

Although the initial slurry for use in making stable batters of this invention must contain farinaceous material, sugar, and aqueous material, most of the other materials conventionally used in batters for preparing baked goods can be added either prior to heating of the slurry or after treatment. However, gas-producing chemical leavening agents should not be added to the batters of this invention prior to the heating step, and, if used, should preferably be added just prior to baking of the batters by the ultimate consumer.

A basic culinary batter can be made by mixing together farinaceous material, sugar and aqueous material and treating the mixture according to the process of this invention. When a baked product is to be prepared a variety of other ingredients can then be added to the basic batter to form the desired product.

For the basic batter, enough water should be present to form a pumpable slurry, although too much water will result in a batter which is too thin to bake. Suitable basic batters can be prepared in proportions of one-half to one and one-half parts, by weight, of farinaceous material per part of water. The basic batter should also contain not less than one-third part, by weight, of sugar per part of water. The upper limit on the amount of sugar will depend upon the desired sugar content of the product to be prepared from the batter. However, the amount of sugar should not be greater than an amount which will dissolve in the water in the batter.

If the temperature of the batter exceeds 200° F., or if the heating exceeds about 10 minutes, the starch in the farinaceous material will gelatinize to an extent that the final batter cannot produce a satisfactory product. If the temperature is less than 180° F., or the time of heating is less than about 8 minutes, the microbiological population will not be decreased to a sufficiently low level, and the batter will lack keeping qualities. At the conclusion of the heating period the slurry must be rapidly cooled to a temperature not exceeding 140° F. In order to prevent excessive gelatinization of the starch this cooling preferably should be done in not over one minute.

The rapid heating and cooling may be accomplished by means of scraped-wall heat exchangers of the "Votator" type, such as are described in U.S. Patents to Vogt, Nos. Re. 21,406, issued March 19, 1940, and 1,783,864, issued September 15, 1946. Such apparatus can also serve to incorporate air into the batter, and this may be desirable, but is not essential for the practice of this invention. Therefore, it is to be understood that other apparatus capable of performing rapid and uniform heating and cooling of a pumpable product can be used in practicing the invention.

When the slurry has been cooled to a temperature not exceeding 140° F., a water-soluble acidic material must be added to the batter to enhance the gelation properties of the starch during baking, which have been reduced by the heating step. The acidic material should be added in an amount capable of supplying about 30 to 65 milli-equivalents of hydrogen ions per 1000 grams of batter.

Less than 30 milliequivalents will not increase the gelling to the necessary degree. An excess of over about 65 milliequivalents of acid material will react with the starch in the batter and adversely affect the baking properties. If an additional microbiological inhibitor is used it can be added either before or after the addition of the acid. The treated batters can be packaged therewith in cans, jars or other suitable containers.

To prepare a batter for baking it is poured out of the container into a suitable baking utensil. A gas-producing leavening agent, such as will hereinafter be described, is added to the batter, and the batter is stirred to distribute the leavening agent. At this time, also, other ingredients can be added. The batter is then baked.

The process of this invention is very suitable for preparing packageable cake batters. Typical composition ranges for basic cake batters are as follows:

| | Parts |
|---|---|
| Farinaceous material | 38 to 48 |
| Sugar | 28 to 45 |
| Aqueous material (as water) | 32 to 50 |

Additional materials which can be added to the basic cake batters either before or after the heating step include:

| | Parts |
|---|---|
| Shortening | 4 to 25 |
| Cocoa | 0 to 7 |
| Egg | [1] 0 to 5 |
| Milk | [1] 0 to 5 |
| Flavoring (including spices) | 0 to 2 |
| Coloring (if used) | minor amounts |

[1] Amount calculated on a dry solids basis.

Farinaceous materials suitable for use in practicing this invention are those commonly used in preparing batters. Thus in addition to wheat flour, other flours can also be used, such as those made from barley, buckwheat, corn, cotton-seed, Lima beans, oats, peanuts, potatoes, rice, rye, soybeans and sweet potatoes. For making cake batters it is preferred to use bleached cake flour. Up to 50% of the cake flour can be replaced by starch. If suitable shortening is used, containing emulsifying agents, a general purpose flour will also provide good baking results.

Suitable sugars include any of the commonly used sugars such as glucose, sucrose, maltose, fructose, lactose and brown sugars. The use of reducing sugars is not desirable in batters which are to be used to make light colored products such as yellow or white cakes, since browning may occur because of reaction of protein and reducing sugar during storage. The sugar can be in granular or powdered form, or as a syrup, and mixtures of more than one type of sugar can be used.

At least a part of the aqueous material can be supplied in the form of eggs and milk which contain water. The milk and eggs can also be added in dried form.

Suitable shortenings include animal and vegetable fats, hydrogenated or unhydrogenated, provided they have sufficient keeping qualities to be stored in unrefrigerated form. The shortening may desirably contain emulsifying agents, particularly in the case where the batter contains a ratio of sugar to flour greater than 1:1. Suitable emulsifiers include partially esterified polyhydric compounds having surface active properties. These include, but are not limited to, mono- and diglycerides of higher fatty acids containing from 12 to 22 carbon atoms, such as monostearin, monopalmitin, monoolein, and dipalmitin; higher fatty acid esters of sugars such as sucrose partial palmitate and sucrose partial oleate; and phosphoric and sulfuric acid esters, such as dodecyl glyceryl ether sulfate and monostearin phosphate. Other suitable partial esters include derivatives of carboxylic acids such as lactic, citric, and tartaric acids. An example of such a derivative is an ester combining lactic and palmitic acids and glycerine, such as lactoglyceryl palmitate. Suitable emulsifying agents also include polyoxyethylene ethers of fatty esters of polyhydric alcohols such as the polyoxyethylene ethers of sorbitan monostearate or the polyoxyethylene ethers of sorbitan distearate.

If cocoa is added prior to the heating step it should be substantially free from alkali which may be present if it has been "Dutch-processed."

The acidic materials suitable for addition to the batters after the cooling step can include any material capable of dissolving in water and supplying hydrogen ions. In addition, these acidic materials should be non-toxic and should not react with other components of the batter to form compounds which will adversely affect the smell, taste, appearance or baking properties of the batters. Suitable acidic materials include edible acids such as lactic, sorbic, ascorbic, sulfuric, citric, hexanoic, peracetic, hydrochloric, and acetic acids. Other acids and acid salts will suggest themselves to those skilled in the art.

Acids such as sorbic, ascorbic, and peracetic acids can additionally serve as microbiological inhibitors. However, if the acidic materials do not have microbiological inhibiting properties it will be necessary to add other non-toxic microbiological inhibitors to the batter after the cooling step. Examples of such microbiological inhibitors include fatty acids, such as propionic acid, and their calcium and sodium salts, and sodium diacetate.

During the heating treatment the batter must be free from gas-producing chemical leavening agent—usually a chemical which will produce gas upon wetting, heating, or contact with acid. The most common chemical of this type is sodium bicarbonate (soda). This compound decomposes to form $CO_2$ upon the application of heat, but also forms sodium carbonate which has a disagreeable taste and produces a yellow color in the end product. Therefore, acidic materials usually are combined with the soda as to form end products which will not adversely affect the flavor or color of the baked goods. These acidic materials are either compositions containing acids such as sour milk, molasses, fruit juice, and honey, or acid salts such as potassium tartrate (cream of tartar), monocalcium phosphate, sodium pyrophosphate, sodium aluminum sulfate, or combinations of these. The acidic materials can be added to the batters prior to treatment if they are able to withstand the heating step without being decomposed to form undesirable byproducts, or will not otherwise react with the components of the batter.

It has also been possible to package the batter in a pressurized container utilizing a volatile propellant such as nitrous oxide, carbon dioxide, or other similar non-toxic materials to dispense the batter and also leaven it at the same time.

The following specific example will serve to illustrate the invention with greater particularity.

*Example I*

A white cake batter was prepared by mixing together the following ingredients in a Hobart mixer for 10 minutes to form a smooth batter:

| | Lbs. |
|---|---|
| Sucrose | 28.80 |
| Shortening [1] | 10.98 |
| Cake flour | 25.98 |
| Skim milk solids | 2.48 |
| Egg white solids | 1.06 |
| Salt | 0.71 |
| Vanilla flavor | Minor amount |
| Water | 29.52 |

[1] A commercial shortening consisting of refined and bleached soybean oil and containing 9% of a mixture of normally solid fatty acid mono-, di-, and tri-glycerides.

The batter was pumped through a scraped-wall heat exchanger under such operating conditions that the temperature of the batter was increased to 180° F. within one minute. The heated mixture was held in an insulated tube for 10 minutes, and then passed through a second scraped-wall heat exchanger whereby the temperature was reduced to 70° F. in one minute. 0.3 lb. of sorbic acid was added to the cooled batter and the batter was stirred for 5 minutes.

420 g. of the batter was placed in a round 8-inch layer cake pan and 2.6 g. of baking soda and 3.6 g. monocalcium phosphate were added. The mixture was stirred about 60 strokes with a spoon and then baked for 25 minutes at an oven temperature of 350° F. The resulting cake was comparable in size, texture and grain with a cake baked from the same batter prior to heat treatment and also with a cake baked from a widely-sold dry prepared cake mix.

Several containers of this batter were stored at 100° F. together with other containers of the same material which had not been heat treated. Counts of the bacterial population were made of each of these batters prior to storage using the Agar Plate Method set forth on page 21 of "Standard Methods for the Examination of Dairy Products," published by American Public Health Association, Inc., 10th Edition, 1953. In this method sterile nutrient culture medium is melted and then partially cooled. One part of batter is thoroughly mixed with 9 parts of medium and the mixture is then promptly solidified and incubated for 48 hours at 37° C. to allow development of visible colonies of bacteria throughout the medium. The number of colonies of bacteria per gram of batter is then counted.

The initial bacterial count of unheated batter was 1005 colonies per gram. The same batter stored for 2 weeks produced a bacterial population too heavy to count, and batter stored 4 weeks produced a mold growth which covered the plate and prevented counting. After 16 weeks storage the batter showed liquefaction of the starch and rotting.

The heated batters showed an initial count of only 75 colonies per gram, and after these batters had been stored for 16 weeks they produced a count of 40 colonies per gram.

These storage tests clearly indicated that the heat treatment not only reduces the initial bacterial population of the batter but also forms batters in which the bacterial population does not increase when stored for an extended period of time in the presence of a microbiological inhibitor.

After the 16 weeks storage period cakes comparable to those produced from freshly-prepared batter could be made after addition of gas-producing leavening agent to the stored batter.

As has been heretofore described, the ingredients of the batters can be changed so as to produce a wide variety of baked goods. In addition, variation can be made in the conditions of heat treating within the scope of the claims, and also in the type of acidic and microbiological inhibiting materials added after heat treatment, and the resulting products will exhibit the same improved keeping properties as compared to conventional batters.

By way of further example, yellow cake batters can be made by using a batter containing whole egg solids. Addition of cocoa to a batter composition will produce a devils-food cake. By using larger amounts of sugar, brownie-type batters can be prepared.

What is claimed is:

1. The method of making a culinary batter capable of being stored for extended periods of time without refrigeration which comprises the steps of forming a homogeneous slurry containing farinaceous material, sugar and aqueous material, heating said slurry to a temperature within the range of about 180° to 200° F., maintaining said slurry in said temperature range for about 8 to 10 minutes, rapidly cooling said slurry to a temperature not greater than about 140° F., adding to said slurry water-soluble acidic material in an amount capable of supplying about 30 to 65 milliequivalents of hydrogen ions per 1000 grams of slurry and if the acidic material does not possess the properties of a microbiological inhibitor, adding a microbiological inhibitor.

2. The method according to claim 1 wherein the slurry comprises one-half to one and one-half parts of farinaceous material per part of water and not less than one-third part of sugar dissolved in water.

3. The method according to claim 1 wherein the slurry is suitable for a cake batter and contains 38 to 48 parts of farinaceous material, 28 to 45 parts of sugar, and 32 to 50 parts of water.

4. The method according to claim 1 wherein the acidic material is selected from the group consisting of lactic, sorbic, ascorbic, sulfuric, citric, hexanoic, hydrochloric, and acetic acids.

5. A culinary batter which can be stored without refrigeration for extended periods of time, said batter comprising heat-sterilized farinaceous material, sugar, aqueous material, water-soluble acidic material in an amount supplying about 30 to 65 milliequivalents of hydrogen ions per 1000 grams of batter and if the acidic material does not possess the properties of a microbiological inhibitor, a microbiological inhibitor.

6. A batter according to claim 5 wherein the batter comprises one-half to one and one-half parts of farinaceous material per part of water and not less than one-third part of sugar dissolved in water.

7. A batter according to claim 5, suitable for baking cakes, which contains 38 to 48 parts of farinaceous material, 28 to 45 parts of sugar, and 32 to 50 parts of water.

8. A batter according to claim 5 wherein the acidic material is selected from the group consisting of lactic, sorbic, ascorbic, sulfuric, citric, hexanoic, hydrochloric, and acetic acids.

References Cited in the file of this patent

UNITED STATES PATENTS

| | | |
|---|---|---|
| 1,625,022 | Fousek | Apr. 19, 1927 |
| 1,974,028 | Komm | Sept. 18, 1934 |
| 2,379,294 | Gooding | June 26, 1945 |
| 2,475,368 | Bauer et al. | July 5, 1949 |
| 2,715,580 | Harrel et al. | Aug. 16, 1955 |
| 2,870,026 | Keller et al. | Jan. 20, 1959 |

FOREIGN PATENTS

| | | |
|---|---|---|
| 455,846 | Great Britain | Oct. 28, 1936 |